(12) United States Patent
Boucher (10) Patent No.: US 12,423,544 B1
(45) Date of Patent: Sep. 23, 2025

(54) SYSTEMS AND METHODS FOR RFID IDENTIFICATION OF OBJECTS

(71) Applicant: Gary R Boucher, Springhill, LA (US)

(72) Inventor: Gary R Boucher, Springhill, LA (US)

( * ) Notice: Subject to any disclaimer, the term of this patent is extended or adjusted under 35 U.S.C. 154(b) by 116 days.

(21) Appl. No.: 18/581,981

(22) Filed: Feb. 20, 2024

Related U.S. Application Data (60) Provisional application No. 63/448,283, filed on Feb. 25, 2023.

(51) Int. Cl.
G06K 19/07 (2006.01)
G06K 7/10 (2006.01)

(52) U.S. Cl.
CPC ..... G06K 19/0709 (2013.01); G06K 7/10366 (2013.01)

(58) Field of Classification Search
CPC .......... G06K 19/0709; G06K 7/10366
USPC ........................................... 235/451
See application file for complete search history.

(56) References Cited

U.S. PATENT DOCUMENTS

| | | | |
|---|---|---|---|
| 4,334,604 A * | 6/1982 | Davies ............... | G07D 5/08 194/346 |
| 12,183,980 B2 * | 12/2024 | Kerner ............... | H04B 7/10 |
| 2015/0057007 A1 * | 2/2015 | Tarighat Mehrabani ............... | H04B 7/0608 455/552.1 |
| 2022/0050162 A1 * | 2/2022 | Zand ............... | H04W 4/023 |
| 2022/0317242 A1 * | 10/2022 | Zhu ............... | G01S 7/026 |

* cited by examiner

*Primary Examiner* — Michael G Lee
*Assistant Examiner* — David Tardif
(74) *Attorney, Agent, or Firm* — R. Keith Harrison (57) ABSTRACT

Systems suitable for RFID identification of at least one object among a population of objects in a high-density object environment using low levels of power generated through electromagnetic induction. A technique is demonstrated whereby energy is accumulated over a period with semi-random and protracted times of transmission to avoid excessive data collisions. Identification of casino tokens or other tagged objects is accomplished through unique serial numbers maintained in a central database. Various methods of electromagnetic excitation assure that randomly placed objects will be reported regardless of orientation or driving energy received.

20 Claims, 6 Drawing Sheets

SYSTEMS AND METHODS FOR RFID IDENTIFICATION OF OBJECTS

CROSS-REFERENCE TO RELATED APPLICATIONS

This application claims the benefit of U.S. provisional application No. 63/448,283, filed Feb. 25, 2023, and entitled SYSTEM FOR IDENTIFICATION OF RFID TAG INFORMATION IN HIGH DENSITY TAG ENVIRONMENTS WHILE MINIMIZING THE EFFECTS OF DATA COLLISIONS, which provisional application is hereby incorporated by reference herein in its entirety.

FIELD

Illustrative embodiments of the disclosure are generally directed to RFID identification systems. More particularly, illustrative embodiments of the disclosure relate to systems suitable for RFID identification of objects in a high-density object environment.

BACKGROUND

The background description provided herein is solely for the purpose of generally presenting the context of the illustrative embodiments of the disclosure. Aspects of the background description are neither expressly nor impliedly admitted as prior art against the claimed subject matter.

Radio Frequency Identification (RFID) is well established in the art. There are however limitations to RFID when a very large number of tags are required, and each use individual addressing to achieve a response, or when multiple tags are energized and produce responses where there are numerous data collisions. Thus, reading numerous tags and separating the responses can prove problematic.

One example of RFID tags not functioning correctly is in the gaming industry where they have been embedded in casino or gaming tokens (chips). Monitoring systems often attempt to read numerous tokens individually while energizing all the tokens in a generalized area of a dealer table. Nearly simultaneous responses can swamp the receiving system due to data collisions from the energized tokens. Token monitoring technology is much sought after but has not emerged as workable in most if not all manifestations.

SUMMARY

Illustrative embodiments of the disclosure are directed to systems suitable for RFID identification of at least one object among a population of objects in a high-density object environment while minimizing data collision effects. An illustrative embodiment of the systems includes an object excitation circuit. The object excitation circuit may include at least one driving coil configured to emit an alternating magnetic flux field. An object circuit in each token is configured such as to generate electrical energy from alternating magnetic flux passing through a receiving coil. Such electrical energy received by each token thus charges a capacitor to a given minimum voltage capable of operating a radio frequency transmitter. Once sufficient energy is stored in the object circuit, a burst of identifying data is transmitted which is unique for each token. An object data processing, storage, and display system may be configured to receive the data bursts, process the data bursts to obtain the object identifying data and record and display the object identifying data.

Illustrative embodiments of the disclosure are further generally directed to methods suitable for identifying at least one object among a plurality of objects. An illustrative embodiment of the methods may include storing data particular to the at least one object; emitting an alternating polarity magnetic flux field; generating an electric current by influence from the alternating polarity magnetic flux field; forming an electrical charge using the electric current; transmitting at least one data burst comprising the data particular to the at least one object responsive to discharging the electrical charge; receiving the at least one data burst; obtaining the data particular to the at least one object by processing the at least one data burst; and recording the data particular to the at least one object.

The present disclosure includes systems and methods of reading many gaming tokens accurately in a relatively short period of time. Thus, the present disclosure has multiple uses outside of the gaming industry.

Illustrative embodiments of the disclosure are related to other methods of RFID in service today in that RFID tags often employ an inductive pickup coil to obtain the energy necessary to create a transmission of data identifying the RFID tag. Illustrative embodiments of the disclosure may modify the conventional approach to RFID by energizing the tags continuously, or in some situations for a relatively long period of time compared to the short duration energizing of a conventional tag. Illustrative embodiments of the disclosure demonstrate how energy can be absorbed at various rates from an induction coil and used to charge a capacitor to a voltage and charge level sufficient to generate and transmit a burst of identifying data containing a unique serial number. This burst of RF data is received in a receiver or receivers located relatively close to the tag locations.

The energy to power the device (tag) is transmitted by an energized coil of wire containing an AC current. One application helpful in demonstrating the utility of the illustrative embodiments of the present disclosure is their use to identify gaming tokens (chips) that are at various locations on a casino's gaming table. This embodiment requires the nearly simultaneous identification of many tokens, and the recording of serial numbers associated with each token. Illustrative embodiments of the disclosure can yield advantages over other methods of RFID identification for many tagged devices in close proximity, thus its application is well suited to many different industries. However, illustrative embodiments of the disclosure may focus on RFID tokens used in the gaming industry as a model for explanation of how the various embodiments of the disclosure function. Although the term "tags" are used universally for RFID transponders, this application may reference the device as a "unit" or "token."

Illustrative embodiments of the present disclosure address the needs of token identification in table games and puts forth a practical solution to measuring the presence of many RFID tags located in close proximity. The present disclosure includes the use of gaming tokens as well as other types of objects and many other different applications suffering from the same technical drawbacks. Because it is not practical to embed a battery in a gaming token, the energy must originate from an external supply as is the case for various manifestations of RFID. Problems arise, however, when the tokens are stacked or spread over a wide location such as on a gaming table. The obvious and well excepted solution is inductive coupling to transfer energy to the gaming token for it to respond, however a problem exists when there are many tokens that must be queried, each with its own ID number and the energized tags transmit at nearly the same time.

This patent application details an approach where energy can be constantly acquired through inductive coupling to coils below the token bins and/or under the player's table position. Such energy coupling would carry no information and would not be used to interrogate the tokens, unlike other RFID schemes. Also, although the energy fed to the tokens is lower in many cases compared to that used to energize most RFID devices, it is continuous in nature and does not require "bursts." Considering hundreds of tokens spread over a large area, the level of coupling and the induced voltage in a coil of wire forming a loop inside the token will vary greatly, and in many cases do not rise to a level of voltage necessary to power a transmitter associated with a serial number for that token.

With small, induced voltages as low as a few hundred millivolts, voltage multiplication can be employed to raise the voltage level sufficiently to charge a capacitor to an appropriate level of energy for transmitting the identifying serial number to a nearby receiver, Thus, the induced voltage would be multiplied and used to charge a capacitor to a given level before the capacitor's energy would be released in a radio frequency burst of digital information, usually but not always at a much higher frequency than the excitation field.

It is conceivable that a given area of a gaming table can possess many tokens, each with induction coils producing different voltages and currents. Charging of each token circuit would therefore take widely varying times, resulting in bursts of token information at different rates. Since the bursts of information are periodic in nature, but lasting for a very short duration, collisions are possible but not as frequent as when large numbers of tokens are energized simultaneously to produce an immediate burst of data. To avoid data collisions between two tokens that release bursts periodically while excited, the driving magnetic field may be varied slightly from one or more coupling coils located under the gaming table. This shifting of available energy as a function of table position from variations in driver coil excitation can result in repeated bursts not continuing to occur simultaneously. This allows, within a reasonable time frame, a burst to be received without collision with another burst from a different token.

Even with multiple collisions of a single token, after a short period of time each token will have its opportunity to transmit without a data collision, ensuring that an extremely high percentage of the tokens have been read. In most applications this should be 100 percent of the tokens within a few seconds.

The token pickup coils must possess a sufficient number of turns in their windings such as to generate enough voltage to exceed the barrier potential of rectifier diodes in the voltage multipliers. However, other approaches used in energy harvesting of low pickup voltages not using conventional diodes may be employed as seen in the current art. With Schottky diodes, threshold should be approximately 200 millivolts. Three methods of generating more usable voltage would include increasing the number of turns in the token's pickup coil, increasing the magnetic flux generated by the driving coil, or using methods to multiply smaller voltages induced. Also adding a parallel capacitance across the inductance of the pickup coil can achieve parallel resonance generating a significantly higher voltage from the coil. The primary energy requirement is to provide enough collected voltage and energy over an acceptable time frame to fire bursts of data.

Each token's data transmission must contain a unique number identifying the token. This number is associated with the denomination of the token as well as any other information needed by the casino. This identifying information is maintained in a computer to be referenced by the data burst from the token. To avoid misread serial numbers resulting from system noise or collisions, the serial number must include error checking such as CRC and/or checksum bits. At high data transmission rates these extra bits will assure a proper serial number read while not adding greatly to the time for burst transmission.

The possibilities for tracking tokens through the casino are virtually unlimited. Counterfeiting of tokens can be minimized through tracking casino-provided tokens issued versus those in play. Although a counterfeit token can be introduced that will have the same weighting and appearance as a legitimate token, it can be identified as not having RFID capabilities by interrogating a fixed number of tokens in a stack where the number of tokens must equal the unique returned RFID information. The stack size for interrogation may be only one token. If a token is illegally manufactured using similar internal circuitry, it must generate a unique serial number. Legitimate serial numbers can be chosen at random from a very large possible pool of serial numbers with hundreds or thousands of serial numbers unused between each legitimate serial number. Generating an unauthorized serial number is a clear indication of a counterfeit token. Also, if the casino tracks two tokens with identical serial numbers due to counterfeit copying of tokens, the casino can be instantly informed with all information to investigate and track the history of the occurrence. Although a token without RFID capability will not be noted by the system, a special location at each casino table may have a separate energizing coil with methods of reconciling number of tokens against received unique serial numbers. High value tokens would be more suspect than lower value ones, so the failure of a high value token would be more suspect for counterfeiting.

In one aspect, the systems and methods of the disclosure may provide the design of an electronic unit capable of being associated with a component to tag the component for the purpose of identifying that component.

In another aspect, the systems and methods of the disclosure may provide the design of a device to harvest low levels of electromagnetic energy and accumulate such energy in a capacitor to build enough energy to facilitate a burst of ID data.

In another aspect, the disclosure may provide a method of using voltage multiplication to increase the voltage of the unit's induction coil to be used to charge a capacitor to a predetermined level for powering a transmission.

In another aspect, the disclosure may provide a method of monitoring via threshold detection an amount of accumulated energy to determine when the level of energy is sufficient to generate a transmission of data.

In another aspect, the disclosure may provide a system which will continue to produce bursts of identifying information at a repetition rate related to the energy collection rate.

In another aspect, the disclosure may provide a system to take identification information form the unit's ROM memory in the form of a serial number and add checksum and/or CRC bits during transmission for error checking.

In another aspect, the disclosure may provide a method of using a portion of the serial number to be transmitted by the unit to add or subtract charge from the capacitor used to accumulate energy for transmission of data shortening or lengthening the cycle period of the transmitted ID data bursts to prevent data repetitive collisions.

In another aspect, the disclosure may provide a method of receiving ID data bursts from RFID units or tags in multiple locations and transferring this information to a computer connected to a database of serial numbers.

In another aspect, the disclosure may provide a method of associating at least one serial number received in a burst transmission and associating that serial number with data maintained in the computer.

In another aspect, the disclosure may provide method of placing electromagnetic coils below a casino table in multiple configurations for consistent energizing of tokens.

In another aspect, the disclosure may provide a method of angling electromagnetic coils to create horizontal flux on a gaming table.

In another aspect, the disclosure may provide a method of phasing various flat coils to achieve different angles of flux to facilitate energizing tokens.

In another aspect, the disclosure may provide a method of selectively energizing certain areas of a gaming table to inventory tokens in those locations only.

In another aspect, the disclosure may provide a computer method of removing a token from the gaming table inventory when it is not identified within a determined period.

In another aspect, the disclosure may provide a computer method of analyzing a known number of tokens and comparing that number to returned RFID serial numbers for that set of tokens.

In another aspect, the disclosure may provide a method of generating and providing unit information from the serial number and computer for other purposes such as recording and display.

In another aspect, the disclosure may provide methods of maintaining a unique serial number for each token that can be read and referenced to a database for tracking all information pertaining to that token.

In another aspect, the disclosure may provide methods for energizing and detecting the number of RFID tokens in a select group at a select location on the gaming table and comparing that number to the known number of tokens being interrogated.

In another aspect, the disclosure may provide methods for energizing selects areas on a gaming table for selective inventorying of token information in that area.

In another aspect, the disclosure may provide methods of determining the number of each denomination and the total monetary value of the dealer's tray of tokens.

In another aspect, the disclosure may provide methods for determining the token information regarding each player's position by energizing only tokens at the player's location.

In another aspect, the disclosure may provide methods of changing the timing of periodic data bursts to avoid continuous collisions of data.

In another aspect, the disclosure may provide methods of harvesting small rates of energy flow to reach a total energy required to transmit meaningful data.

In another aspect, the disclosure may provide methods of choosing token serial numbers so as to help guard against unauthorized duplication of tokens.

In another aspect, the disclosure may provide methods of detecting duplicate serial numbers at multiple locations in a casino to identify fraudulent token duplication.

These and other objects, features, and advantages of the subject matter set forth in the present disclosure will become more readily apparent from the attached drawings and the detailed description of the illustrative embodiments, which follow.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the subject matter as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims, Hence, specific dimensions and other physical characteristics relating to the embodiments disclosed herein are not to be considered as limiting, unless the claims expressly state otherwise.

All methods set forth in the present disclosure may be performed in any suitable order of steps unless otherwise indicated herein or contradicted by the rules of logic. The use of any and all examples or exemplary language provided herein is intended to clearly describe the subject matter of the disclosure and is not intended to be limiting on the scope of the subject matter set forth in the claims. No element, step, ingredient, or limitation mentioned or described in the specification shall not be construed as regarding any unclaimed component, step, or limitation to be essential in practicing the claimed subject matter.

Unless expressly or implicitly indicated otherwise, throughout the description and the appended claims, the terms "comprise", "comprising", "comprised of" and the like are to be construed in an inclusive sense as opposed to an exclusive or exhaustive sense, and are equivalent to the phrase, "including but not limited to". Each embodiment disclosed herein can comprise, consist essentially of, or consist of its particular stated element, step, ingredient, or limitation. As used herein, the transition terms "comprise", "comprises", "comprising", "include", "includes" "including", "is", "has", "having" or the like means "includes, but is not limited to, and allows for the inclusion of unspecified elements, steps, ingredients, or limitations, even in major amounts". The transitional phrase "consisting of" excludes any element, step, ingredient, or limitation not specified. The transition phrase "consisting essentially of" shall limit the scope of the embodiment to the specified elements, steps, ingredients, or limitations and to those that do not materially affect the embodiment. Throughout the written description, drawings and claims appended hereto, unless otherwise noted, it shall be recognized and understood that each embodiment of the described, illustrated and claimed subject matter may comprise, consist essentially of, or consist of any component, element or combination of components or elements set forth herein.

Unless otherwise noted using precise or limiting terminology, all numbers which express quantities of ingredients throughout the specification and claims are to be understood as being approximations of the numerical value cited to express the quantities of those ingredients. As used throughout the specification and claims, the term "about" has the meaning reasonably ascribed to it by a person skilled in the art when used in conjunction with a stated numerical value or range. i.e., denoting from the exact stated value or range to somewhat more or somewhat less than the stated value or range, from a deviation of from 0% with respect to the stated value or range to up to and including 20% of the stated value or range in either direction.

Various illustrative embodiments of the disclosure are described herein. Variations on the described illustrative embodiments may become apparent to those of ordinary skill in the art in reading the specification, drawings and claims of the disclosure. Accordingly, the disclosure encompassed by the specification, claims and drawings includes all modifications and equivalents of the subject matter recited in the claims as permitted by applicable law. Additionally, any combination of the elements in all possible variations thereof is encompassed by the subject matter of the disclosure unless otherwise indicated herein.

Figure 9:
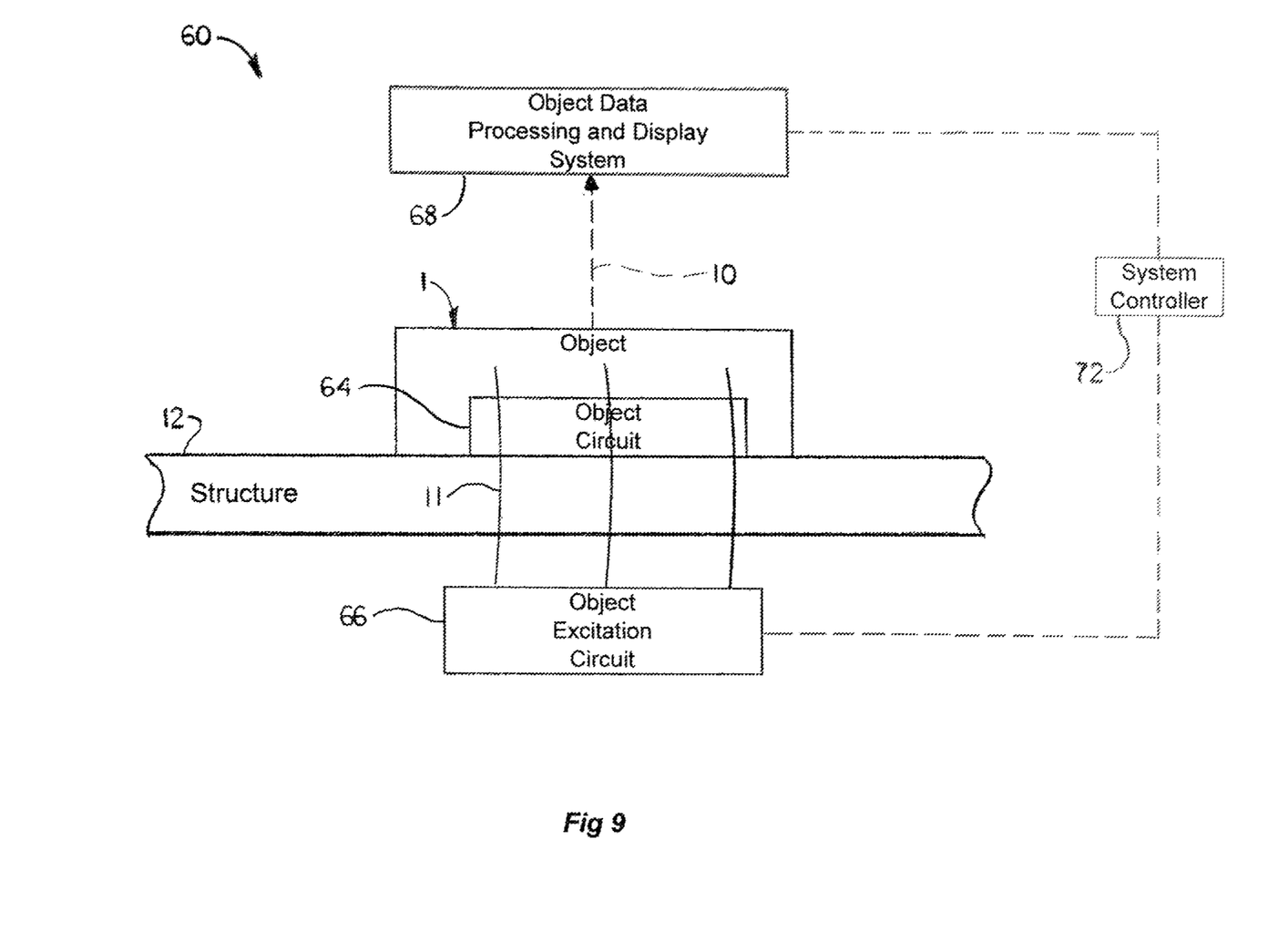
FIG. 9 is a block diagram of an illustrative embodiment of the systems for RFID tag identification in high density tag environments while minimizing data collision effects.

Referring initially to FIG. 9 of the drawings, an illustrative embodiment of the systems for RFID tag identification of at least one object among a population of objects in a high-density object environment while minimizing data collision effects, hereinafter system, is generally indicated by reference number 60. The system 60 may be suitable for identifying at least one object 1 among a plurality of the objects 1 in the same environment. For example and without limitation, in some applications of the system 60, the objects 1 may include gaming tokens. Accordingly, the system 60 may be configured to identify at least one gaming token 1 typically as a population of the gaming tokens 1 rest on a casino table or other support structure 12, hereinafter casino table 12, typically as will be hereinafter described. In other applications, the objects 1 may include manufactured items in a factory and/or inventory stored in a warehouse or distribution system, for example and without limitation. The system 60 may include an object excitation circuit 66. The object excitation circuit 66 may include at least one driving coil 24 which may be configured to emit radio frequency (RF) signals as an alternating polarity magnetic flux field, hereinafter magnetic flux field 11.

An object circuit 64 may be configured to be supported by the object 1. The object circuit 64 may be subject to electrical charging responsive to influence from the magnetic flux field 11 emitted by the object excitation circuit 66. The object circuit 64 may be configured to store object identifying data which is unique or particular to the object 1 and can be used to distinguish the object 1 from a population of other objects 1 in the same environment. For example and without limitation, in some embodiments, the object identifying data may include at least one serial number which is unique or particular to the object 1. The object circuit 64 may be configured to access the stored object identifying data and transmit at least one data packet or burst, hereinafter data bursts 10 typically as an RF signal which contains or carries the object identifying data. The object circuit 64 may be configured to transmit the data burst or bursts 10 responsive to the influence from the magnetic flux field 11.

An object data processing and display system 68 may be configured to receive the data bursts 10 from the object circuit 64. The object data processing and display system 68 may further be configured to process the data bursts to obtain the object identifying data and store and/or display and/or otherwise indicate, hereinafter display, the object identifying data.

In some embodiments, a system controller 72 may interface with the object excitation circuit 66. The system controller 72 may be configured to operate the object excitation circuits 66 of one or more selected ones of multiple objects 1 to obtain the object identifying data of the object or objects 1, typically as will be hereinafter described.

Figure 1:
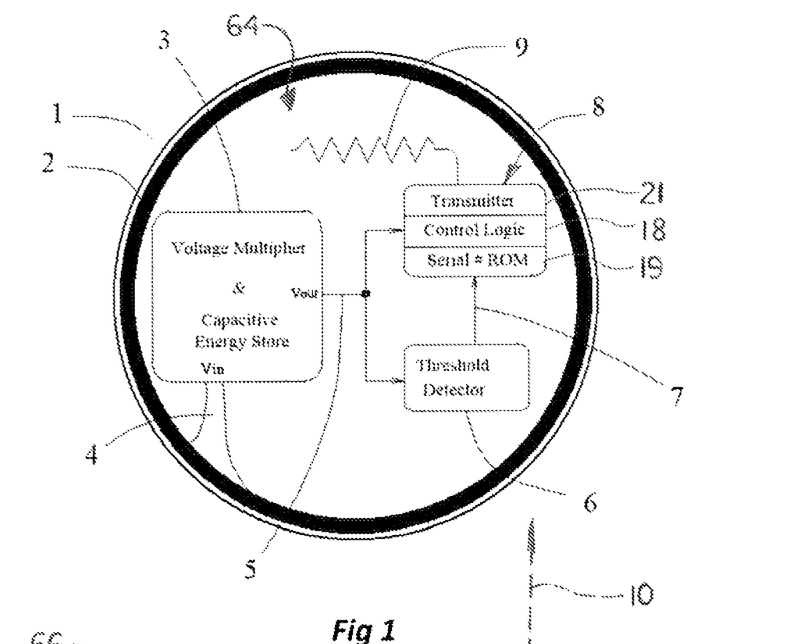
FIG. 1 is a block diagram of a single gaming token having a typical token electronic circuit according to an illustrative embodiment of the systems of the disclosure.
Figure 2:
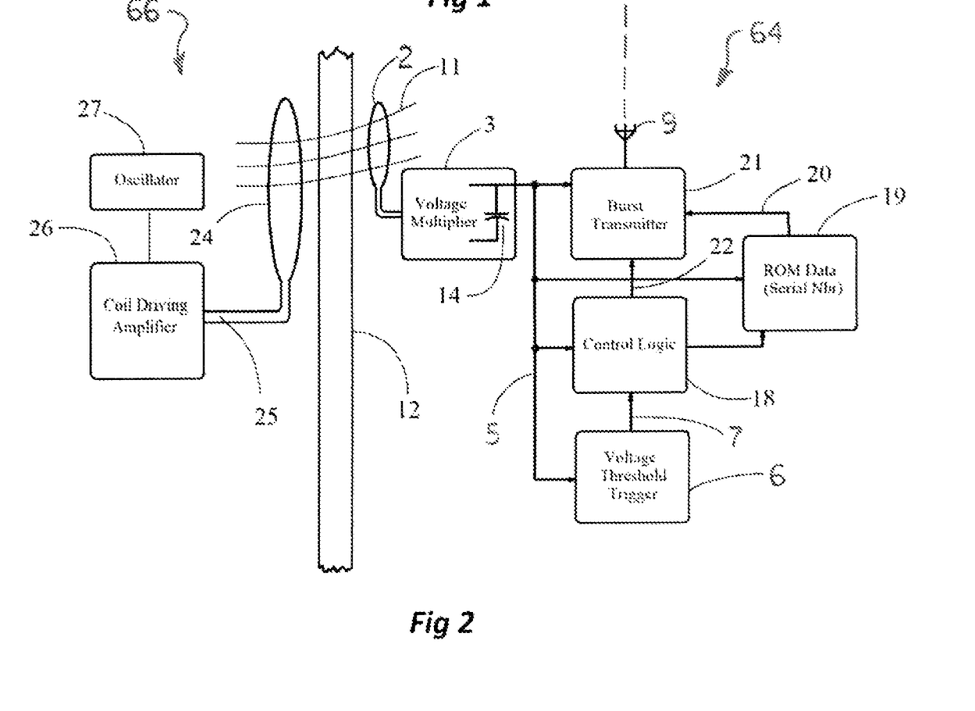
FIG. 2 is a block diagram of a typical token excitation circuit and a token electronic circuit according to an illustrative embodiment of the systems.
Figure 3:
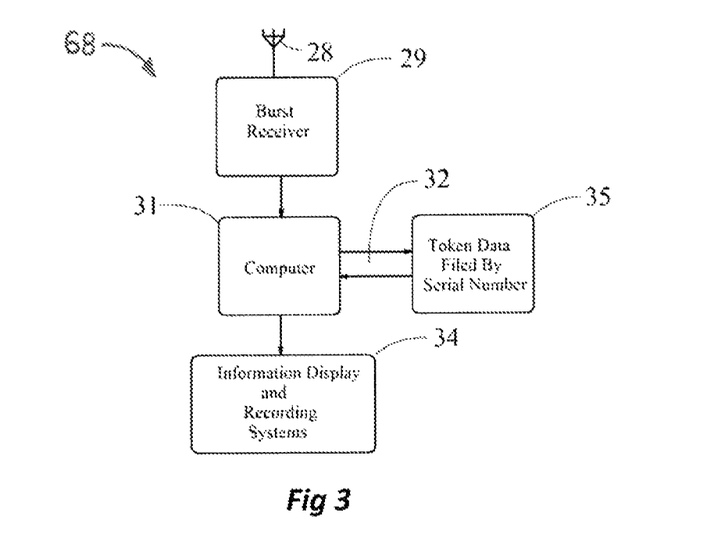
FIG. 3 is a block diagram of a typical receiver and receiver circuit suitable for receiving and processing bursts of data from the token excitation circuit in typical application of the systems.

Referring next to FIGS. 1-3 of the drawings, a typical gaming token as the object to be identified, hereinafter gaming token 1 (FIG. 1), is shown according to an illustrative embodiment of the systems of the disclosure. In some embodiments, the object identifying data may include the denomination of each token 1. The object circuit 64 of the gaming token 1 may include at least one induction coil 2. The induction coil 2 may be optimally wound near the outer perimeter of the gaming token 1 to increase the area of the induction coil 2 which is available for optimum energy reception. The induction coil 2 may be configured to generate electric current responsive to the influence from the magnetic flux field 11 emitted by the object excitation circuit 66 (FIG. 9). As illustrated in FIG. 2, a voltage multiplier 3 having a capacitor 14 may interface with the induction coil 2, An RF burst transmitter 21 may interface with the capacitor 14 of the voltage multiplier 3. The burst transmitter 21 may be configured to transmit the data bursts 10, typically as will be hereinafter described.

As further illustrated in FIG. 2, the object circuit 64 may further include a memory with dedicated storage such as a ROM (Read Only Memory) with dedicated storage, for example and without limitation (hereinafter ROM 19). The ROM 19 may interface with the voltage multiplier 3 and with the burst transmitter 21. The ROM 19 may be configured to store the serial number(s) and/or other object identifying data for the gaming token 1.

In some embodiments, the object circuit 64 may include a control logic 18 which may interface with the voltage multiplier 3, the burst transmitter 21 and the ROM 19. The control logic 18 may be configured to initiate transmission of the data bursts 10 which identify the gaming token 1 by imbedding the serial number and/or other object identifying data stored in the ROM 19. In some embodiments, a voltage threshold detector or trigger 6 may interface with the voltage multiplier 3 and with the control logic 18 typically for purposes which will be hereinafter described. Such trigger device may be a simple comparator capable of comparing the capacitor voltage to a fixed level of voltage to determine adequate charge level to fire a burst of information.

As illustrated in FIG. 1, in some embodiments, two or more components of the object circuit 64, such as the burst transmitter 21, the control logic 18 and/or the ROM 19, for example and without limitation, may be contained in a module 8. An antenna 9 may extend from the burst transmitter 21. The antenna 9 may be configured to transmit the data bursts 10 (FIG. 9) from the burst transmitter 21 to the object data processing, storage, and display system 68.

As illustrated in FIG. 2, the object excitation circuit 66 of the system 60 may include an oscillator 27. A coil driving amplifier 26 may interface with the oscillator 27. The driving coil 24 may interface with the coil driving amplifier 26. In some applications, the object excitation circuit 66 may be disposed adjacent to or beneath the casino table or other structure 12 at a position which corresponds to the position of the gaming token or tokens 1.

As illustrated in FIG. 3, the object data processing, storage, and display system 68 of the system 60 may include a burst receiver 29. The burst receiver 29 may be configured to receive the data bursts 10 from the object circuit 64 (FIG. 2), typically via a receiving antenna 28. At least one computer 31 may communicably interface with the burst receiver 29. The computer 31 may include, or at least one information display and recording system 34 may communicably interface with, the computer 31. The computer 31 may be configured to process the data bursts 10 to obtain the serial number and/or other object identifying data and record or store and display and/or otherwise indicate the object identifying data via the information display and recording system 34.

An object database 35 may communicably interface with the computer 31, typically via a two-way communication 32. The object database 35 may be configured to store reference data which relates to the serial number and/or other object identifying data specific to the gaming token 1. The computer 31 may have the capability to look up the reference object identifying information received via the data burst 10 in the object database 35 for verification and identification purposes. As used herein, the computer 31 may include any computational device or combination of computational devices such as but not limited to one or more of the following: desktop computers, laptop computers, personal electronic devices such as tablet computers and smartphones, servers, cloud servers, and/or any other device, subsystem, web-based system or platform, or combination of devices or subsystems which, with supporting software, is configured and programmed to carry out the functions of the computer 31 described herein. The information display and recording system 34 may be a component part of the computer 31, or alternatively, the computer 31 may interface with a separate information display and recording system 34 having the capability to record and display and/or otherwise indicate the serial number and/or other object identifying data of the gaming token 1. In some embodiments, the computer 31 may implement the functions of the system controller 72 (FIG. 9) or may be part of the system controller 72.

In typical application of the system 60, the system controller 72 (FIG. 9) may be operated to interrogate one or more of the casino tokens 1 at the casino table 12 or within a casino containing multiple casino tables 12 to obtain the serial number and/or other object identifying data of the casino token(s) 1. Typically responsive to operation of the system controller 72, the magnetic flux field 11 may be generated by the oscillator 27 and the coil driving amplifier 26 and emitted by the driving coils 24 of the object excitation circuit 66. The magnetic flux field 11 may pass through the induction coil 2 of the object circuit 64 on the gaming token 1 to generate a voltage which may be transferred through connection wires and/or other electrical contacts 4 to the voltage multiplier 3 having the capacitor 14 (FIG. 2) with the capacitive means to accumulate electrical charge. As electrical charge accumulates in the capacitor 14, the voltage of the capacitor 14 may rise along with the available energy needed to send the burst data from the burst transmitter 21. Via a power connection 5, the output of the voltage multiplier 3 may interface with the burst transmitter 21, the control logic 18, the ROM 19, the voltage detector 6 and/or other electronic circuits and/or components that may require this voltage for operation of the system 60.

As the voltage of the charge which accumulates in the capacitor 14 in the voltage multiplier 3 increases while electric current is being harvested from the magnetic flux field 11 by the induction coil 2, a set threshold voltage of the electrical charge in the capacitor 14 may be reached such that the burst transmitter 21 can send a burst of data 10 (FIG. 8), to the burst receiver 29 (FIG. 3) of the object data processing and display system 68. When that threshold is identified by the threshold detector 6, a signal is sent via a connection 7 to a module 8 that may include a burst transmitter 21, a control logic 18, and a ROM 19 with dedicated serial number storage. The control logic 18 may be configured to initiate the transmission of a "burst" of data identifying the gaming token 1 by imbedding a stored serial number from ROM. The transmitter circuitry of the burst transmitter 21 may use an antenna 9 which may be located inside the gaming token 1.

A more detailed view of the gaming token 1 with the object circuit 64 is shown in FIG. 2. The oscillator 27 of the object excitation circuit 66 may be configured to generate a sine wave signal at some frequency that can be chosen over a wide range of possibilities. One usable frequency may include 8 kHz, but other frequencies can be used that are lower or higher in frequency. The coil driving amplifier 26 of the object excitation circuit 66 may be configured to receive the signal from the oscillator 27 and generate a higher current version of the signal to be fed to driving coil(s) 24 which in some applications may be disposed beneath the casino table or other structure 12. Responsive to the signal from the coil driving amplifier 26, the driving coil 24 may generate the magnetic flux field 11 which may pass through the casino table 12 and ultimately pass through the induction coil 2 of the object circuit 64, thereby producing an electric current of small voltage in the induction coil 2. In some applications, the voltage of the electric current generated in the induction coil 2 may be too small to drive the burst transmitter 21 effectively. Accordingly, the voltage multiplier 3 may increase the voltage of the electric current to adequate levels which are sufficient to drive the burst transmitter 21. Any of various types of voltage multipliers may be used for the purpose, as there are different approaches to voltage multiplication, many of which use some form of low forward voltage diodes. These types of voltage multiplication circuits are well known by those skilled in the art. Also, adding a capacitor (not shown) across the induction coil 2 can cause the induction coil 2 and the capacitor to become resonate at the frequency of the oscillator 27 and thus the driving coil 24 increasing the voltage to be initially delivered to the voltage multiplier 3.

The output of the voltage multiplier 3 may include one or more capacitors as part of the circuit but, if necessary, a separate capacitor 14 can be placed at the output of the voltage multiplier 3 to act as a reservoir for charge. As the voltage of the electrical charge which accumulates in the capacitor 14 rises, the voltage may ultimately reach a level that will facilitate transmission of the data burst 10 by the burst transmitter 21, typically via the antenna 9. To determine the point at which transmission of the data bursts 10 is possible, the voltage threshold circuit 6 may constantly observe the voltage of the electrical charge in the capacitor 14, typically through the power connection 5. At a certain point in time when the voltage reaches the predetermined firing voltage, a trigger current may be sent to the control logic 18, typically via a connection 7. The control logic 18, typically via a control connection 22, may then initiate the data burst 10 by enabling the burst transmitter 21. The control logic 18, typically through a data pathway 20, may also initiate transmission of the object identifying data which is particular to the gaming token 1 from the ROM 19 to the burst transmitter 21. The object identifying data may represent the serial number and/or other identifying information of the gaming token 1, along with checksum and/or CRC information.

Once a burst of data 10 has been transmitted from the burst transmitter 21 and electrical charge has been discharged from the capacitor 14, the voltage of the electrical charge in the capacitor 14 will drop, but not far enough in level to affect the last bits of the data bursts 10 to be transmitted before the operation is complete. With the induction coil 2 continuing to obtain energy from the magnetic flux field 11, and the bulk of the other circuitry and components in the object circuit 64 using very little energy, the voltage of the electrical charge in the capacitor 14 will begin to rise once more. This cycle may repeat where the time for the generated data bursts 10 is very small compared to the time between the data bursts 10. It should be noted that the stronger the magnetic field of the magnetic flux field 11 at the induction coil 2, the faster the recharging of the capacitor 14 and firing of the data bursts 10 from the burst transmitter 21 will occur. Also using a higher frequency magnetic flux will increase the voltage induced in the coil 2.

As illustrated in FIG. 3, once each data burst 10 is received by the burst receiver 29 typically via the receiving antenna 28, the object identifying data may be fed into the computer 31. The computer 31 may have sufficient processing capacity to be able to reference a relatively large object database 35 of object identifying data typically via the two-way connections 32 where the received burst serial number and/or other object identifying data could be looked up in the object database 35. Ultimately, the computer 31 may determine which gaming tokens 1 were at play, and possibly where the gaming tokens 1 are on the casino table 12 at any given time. This information may be used in a variety of ways as required by the casino, such as via displays and/or recording for the information display and recording system 34, for example and without limitation.

In some applications of the system 60, multiple burst receivers 29, each typically attached to its corresponding receiving burst antenna 28, may be used such that the burst antennas 28 are located in numerous locations on or near the casino gaming tables 12. This may shorten the distance which a gaming token 1 will need to transmit its data bursts 10 and may lower the power requirement for each burst transmitter 21. This may allow for lower levels of RF energy to be used by each gaming token 1, thereby satisfying potential regulation problems with the FCC, Each burst receiver 29 may maintain a queue of received serial numbers and/or other object identifying data that can be requested by the computer 31, or the burst receivers 29 can automatically feed their received object identifying data to the computer 31 as the data is generated. Duplicate numbers and/or other periodically received data from the same tokens at the same locations are of no consequence to the system 60.

It is understood that, in some embodiments, a casino table 12 which supports many gaming tokens 1 may generate data bursts 10 continuously as the drive energy in magnetic coupling form may cause constant data bursts 10 from each gaming token 1. However, with gaming tokens 1 in different table locations, and with different angles and distances from the driving coils 24 of the object excitation circuits 66, the rate that each gaming token 1 will report its serial number and/or other object identifying data via a data burst 10 may vary greatly. It is further understood that in some applications, many data collisions may occur. However, many data bursts 10 will get through to the burst receiver 29, and ultimately, to the computer 31 without interference due to collisions. The system 60 should be designed to utilize data burst times which are as short as possible with a reasonably long time period for token cycling between bursts. In this way, a token's data burst 10 may, for example, generate a collision 80 times, yet on the $81^{st}$ attempt get through to the computer 31. The entire 81 burst cycles may only represent a few seconds in time. With this scheme, in a few seconds the chance that a gaming token 1 will not be identified is highly unlikely. The manner of operation of the system 60 may potentially be slower than other forms of RFID, but yet capable of reconciling an inventory of gaming tokens 1 over a period of time, usually in seconds. In some applications, a gaming token 1 may be removed from the inventory of the computer 31 if a period of time elapses in which the gaming token 1 is no longer identified on the casino table 12.

Each element or component of the object circuit 64, the object excitation circuit 66 and the object data processing and display system 68 may include hardware elements, software elements, or combinations of hardware elements and software elements configured and programmed to carry out the functions of the respective object circuit 64, object excitation circuit 66 and object data processing and display system 68 described herein. For example and without limitation, any or each of the functional components of the object circuit 64, the object excitation circuit 66 and the object data processing, recording, and display system 68 described herein may include a printed circuit board (PCB) having the necessary processors, controllers, or combination of processors or controllers with the processing, data storage and/or function-implementing capabilities and supporting software configured to carry out the various functions of the system 1 described herein.

Figure 4:
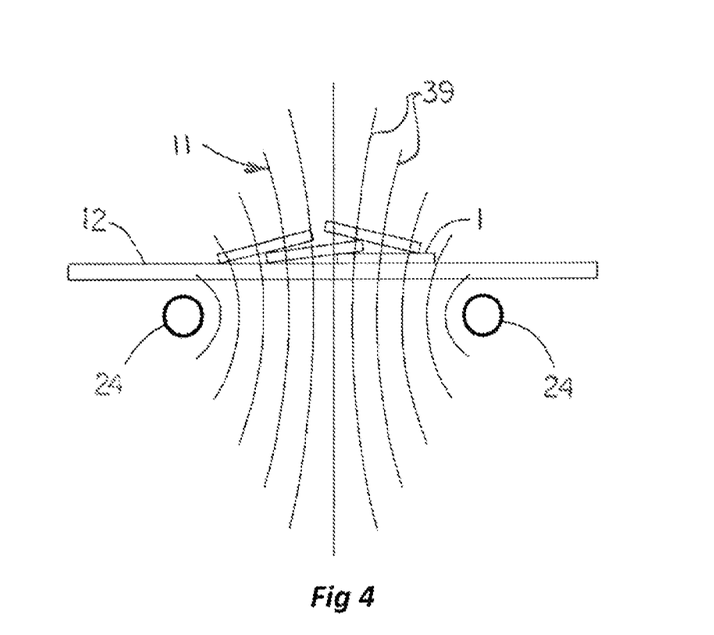
FIG. 4 is a diagram illustrating typical generation of lines of flux below the casino table by operation of the token excitation circuit and penetration of the lines of flux through the table to the tokens to couple energy to the tokens.

Referring next to FIG. 4 of the drawings, in some embodiments of the system 60, a single driving coil 24 may be disposed beneath the casino table 12. Flux lines 39 of the magnetic flux field 11, emitted by the driving coil 24, may pass through the casino table 12 into the gaming tokens 1 arranged in various manners but with mainly horizontal orientation on the casino table 12. Each gaming token 1 may receive a quantity of energy at a variable rate, thus generating data bursts 10 at various intervals. The driving coil 24 may have a circulating current, typically in one or more turns of wire. Thus, in FIG. 4, the current may enter the driving coil 24 on the right-hand side of the flux lines 39 of the magnetic flux field 11 and exit the driving coil 24 on the left-hand side of the flux lines 39, resulting in an upward pointing trajectory to the flux lines 39 through the driving coil 24. A short time later, as the polarity of the drive current in the driving coil 24 changes, the reverse will be true, changing the direction of the magnetic field of the flux lines 39 to downward.

Figure 5:
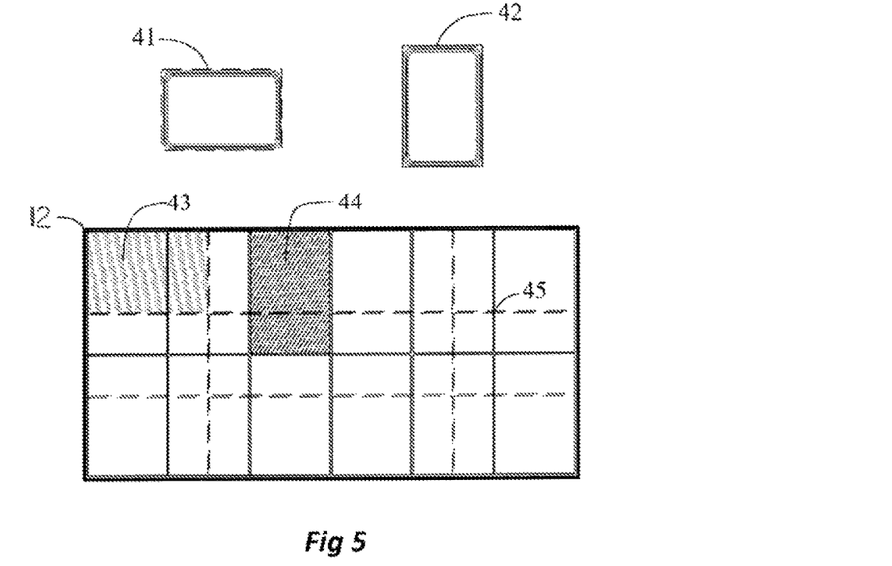
FIG. 5 is a diagram of a casino table having overlapping driving coils.

Referring next to FIG. 5 of the drawings, because driving coils placed below a gaming table 12 may have "dead spots", it may be advantageous to overlap the driving coils 41, 42, 43, 44. Here, rectangular driving coils 41, 42 may be used to cover the desired area of the gaming table 12. The rectangular driving coils 41, 42 can be energized where all horizontal driving coils 43 are energized at once and then all the vertical driving coils 44 can be energized later, virtually eliminating dead spots. In locations in which both the horizontal driving coils 43 and the vertical driving coils 44 may have their perimeters at the same location 45, another driving coil 42 may be placed to cover the possible dead location. It will be recognized and understood by those skilled in the art that many different coil placements and excitation schemes are possible in different applications.

Figure 6:
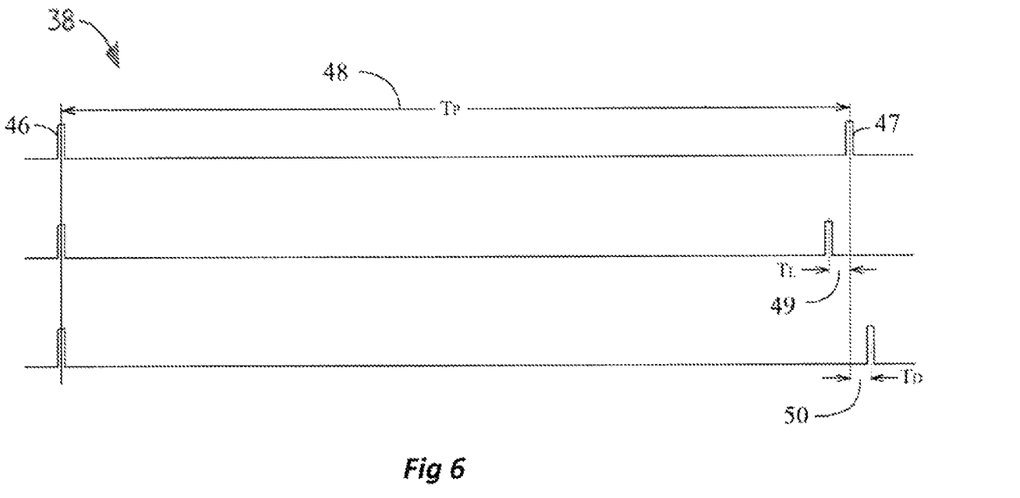
FIG. 6 is a graph illustrating a typical burst repetition rate for a given amount of token energy being received by the token electronic circuit of a gaming token from the token excitation circuit and modification of the burst cycle timing by pseudo random numbers obtained from the serial number of the token.

A potential problem for detection of a gaming token 1 may arise under circumstances in which the gaming token 1 is in the same location on the casino table 12 as another gaming token 1 and has a rate of data burst generation which identically matches that of the other gaming token 1. This could cause continuous data collisions for some period of time if the data bursts 10 of the gaming tokens 1 are identical and coincide exactly. Accordingly, FIG. 6 shows a typical timing diagram 38 for emission of the data bursts 10 from a gaming token 1. The gaming token 1 generates a first data burst 46 for a very short duration relative to the total data burst cycle period. In the timing diagram 38, the first data burst 46 is represented as a pulse rather than an AC signal. The gaming token 1, while recharging at a rate which is determined by the quantity of energy it is receiving from its induction coil 2, will fire again at a second data burst 47 after a rest period 48 between the first data burst 46 and the second data burst 47. This rest period 48 is designated as TP, or the burst cycle period. The rest period 48 will repeat if the AC magnetic field strength of the magnetic flux field 11 received and the position of the gaming token 1 on the casino table 12 are constant. To greatly lower the probability of two gaming tokens 1 having the same exact burst rate and experiencing repeated collisions, the rest period 48 may be altered slightly by shortening this period by an amount equal to the time interval 49, or by lengthening the burst cycle period by a time interval 50. The time period 49 and the time period 50 are represented in the figure as TL and TD respectively.

A process for shortening or lengthening the total data burst cycle period could rely on a random process, but the addition of such a process to the gaming token 1 may involve increased complexity. A simple and straightforward method may be to use the stored ROM serial number and/or other object identifying data itself as a non-similar set of numbers that can be used by the control logic 18 (FIG. 2) of the object circuit 64 to shorten or extend the total data burst cycle period by TL or TD. Since the serial number is unique and in binary, it can be evaluated bit by bit as it is being transmitted in a data burst 10. If all serial number bits are used, then the burst cycle rate will always be the same and defeat the purpose of using these random bits. Therefore, the evaluation may be necessary with respect to a few, but not all, the available bits in each data burst cycle. If only a few bits are used each cycle, then changing the bits used over time in a rotation will modify the burst cycle timing with each burst generation. Using CMOS technology, each bit of the serial number that is used can dump a small but different amount of charge from, or to, the storage capacitor associated with the voltage multiplier, thus changing the period of time which will elapse before the next data burst 10. This randomness should easily break identical burst cycle timings. Moreover, changing the magnetic polarity and/or currents in one or more of the driving coils 24 in a non-symmetric manner can reshape the magnetic flux field 11, thus breaking the simultaneity of the burst rates of the data bursts 10. Different schemes for altering these parameters are too numerous to mention, but well within the ability of one who is trained in the art. Thus, the coil activation, current, polarity, etc. may be changed electrically to assure that all gaming tokens 1 are activated within a reasonable time frame.

Figure 7:
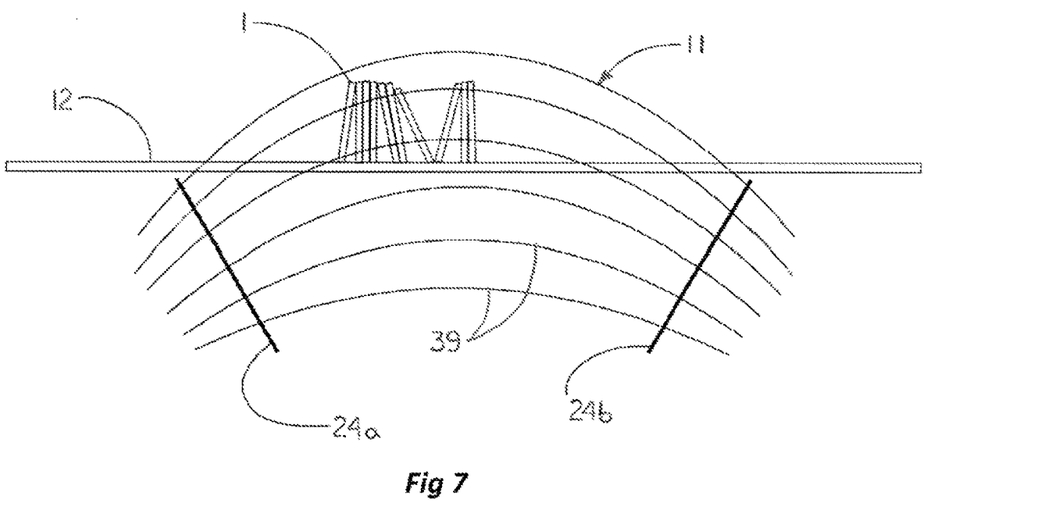
FIG. 7 is a diagram of two drive coils angled beneath the casino table such that lines of magnetic flux can exit one coil and enter the other coil, thereby yielding flux lines with a horizontal component orientation.

Referring next to FIG. 7 of the drawings, in some applications of the system 1, horizontal orientation of the magnetic flux field 11 may be required if the gaming tokens 1 are at times resting in a token bin, for example, in a near or completely vertical position on the casino table 12. Accordingly, a first driving coil 24a and a second driving coil 24b may be positioned below the gaming table 12. These angled driving coils 24a, 24b may carry current in a manner such as to create the magnetic flux field 11 to the upper right for the first driving coil 24a and to the downward right through the second driving coil 24b. The resulting magnetic flux field 11 may penetrate the gaming table 12 and any vertically positioned gaming tokens 1. In much the same manner as the flat driving coils 24 described above with respect to FIGS. 1-6, angled driving coil 24a, 24b can be overlapped with other configurations of coils for proper flux coverage and be engaged in a round robin manner to assure all gaming tokens 1 will be energized for a period of time.

Coil-driven magnetic flux fields 11 may include not only the left-right magnetic orientation as illustrated in FIG. 7 but may also include front-back orientations also. Any number and/or orientation of the driving coils 24 may be selected to facilitate exposure of all the gaming tokens 1 to sufficient flux through their respective induction coils 2 no matter what the orientation of the gaming token 1 on the gaming table 12.

Although the driving coils 24 depicted in FIG. 7 are angled to aid in the creation of horizontal lines 39 of the magnetic flux field 11, the driving coils 24 may also function in this regard if placed flat at some distance below the top of the gaming table 12. To assure adequate horizontal orientation to the magnetic flux field 11, the driving coils 24 can be located at a greater depth below the gaming table 12 such that bowing of the flux lines 39 of the magnetic flux field 11 is more horizontal prior to exiting the gaming table 12. With proper overlapping and phasing of the electric currents flowing through the driving coils 24, full vertical and horizontal coverage throughout the surface of the gaming table 12 can be achieved.

In some applications of the system 60, the object database 35 of the object data processing and display system 68 may maintain a unique serial number and/or other object identifying data which is particular to each corresponding gaming token 1. The computer 31 may reference the object database 35 for tracking of all information which pertains to each gaming token 1. The gaming tokens 1 on one or more selected areas on the casino table 1 may be selected for selective inventory of the information of the tokens 1 in that particular area or areas. The system controller 72 may energize and detect the number of RFID tokens 1 in a select group of tokens 1 at one or more select locations on the casino table 12 and compare that number of the tokens 1 to the known number of tokens 1 being interrogated.

In some applications of the system 60, the computer 31 may determine the number of tokens 1 of each denomination and the total monetary value of each tray of tokens 1 on the casino table 12. The object identifying data which relates to the casino tokens 1 of each player at the casino table 12 may be obtained by energizing only the induction coils 2 of the casino tokens 1 at that player's position on the casino table 12. The timing of the data bursts 10 may be altered, changed or controlled to avoid, prevent or minimize continuous collisions of data. Small rates of energy flow may be harvested to reach a total level of energy required to transmit meaningful data via the data bursts 10. As used herein, "meaningful data" means the minimum quantity of data required to identify or convey at least one item or aspect of the object identifying data. The serial numbers and/or other object identifying data of each casino token 1 may be chosen and processed so as to guard against unauthorized duplication of the casino tokens 1. Duplicate serial numbers of the casino tokens 1 may be detected on casino tables 12 at multiple locations throughout a casino to identify fraudulent token duplication.

Figure 8:
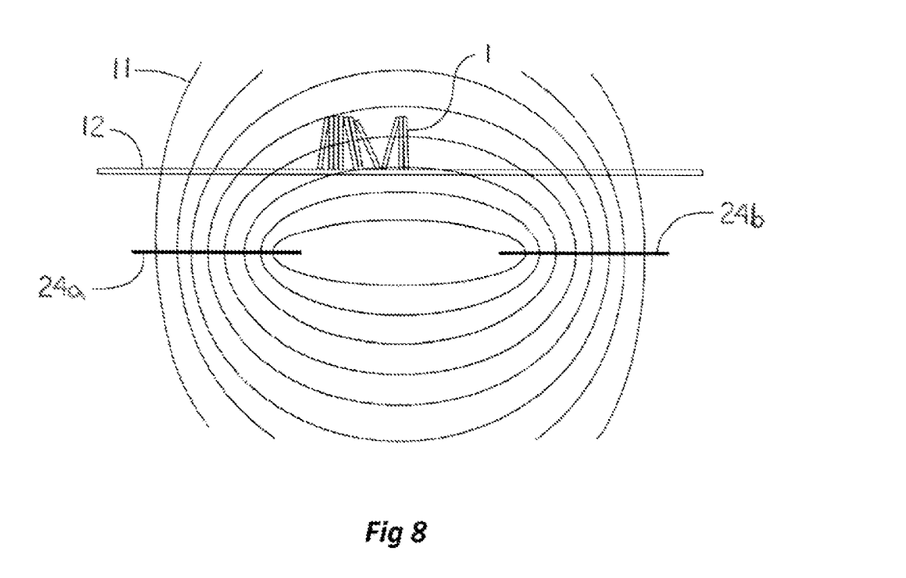
FIG. 8 is a diagram illustrating a flat drive coil orientation used to create horizontally oriented flux without tilting the drive coil.

Referring next to FIG. 8 of the drawings, in some embodiments of the system 1, a pair of drive coils 24a, 24b may be positioned in a horizontal location some distance below the gaming table 12. The electric current in the drive coils 24a. 24b may flow in the opposite directions, into and out of the plane of the drawing producing a magnetic flux field 11 which moves upwardly from the left-hand drive coil 24a and downward through the right-hand drive coil 24b. This magnetic flux field 11 may be predominantly horizontal in the region of the gaming tokens 1 to be energized. The resulting magnetic flux fields 11 may be overlapped and energized in rotation, thereby ensuring that all gaming tokens 1 on the gaming table 12 will be energized properly. There are many possible embodiments of coil placement and activation that almost assuredly will cover and ensure the energizing of each and every gaming token 1 in a group of gaming tokens 1 on the gaming table 12.

Figure 10:
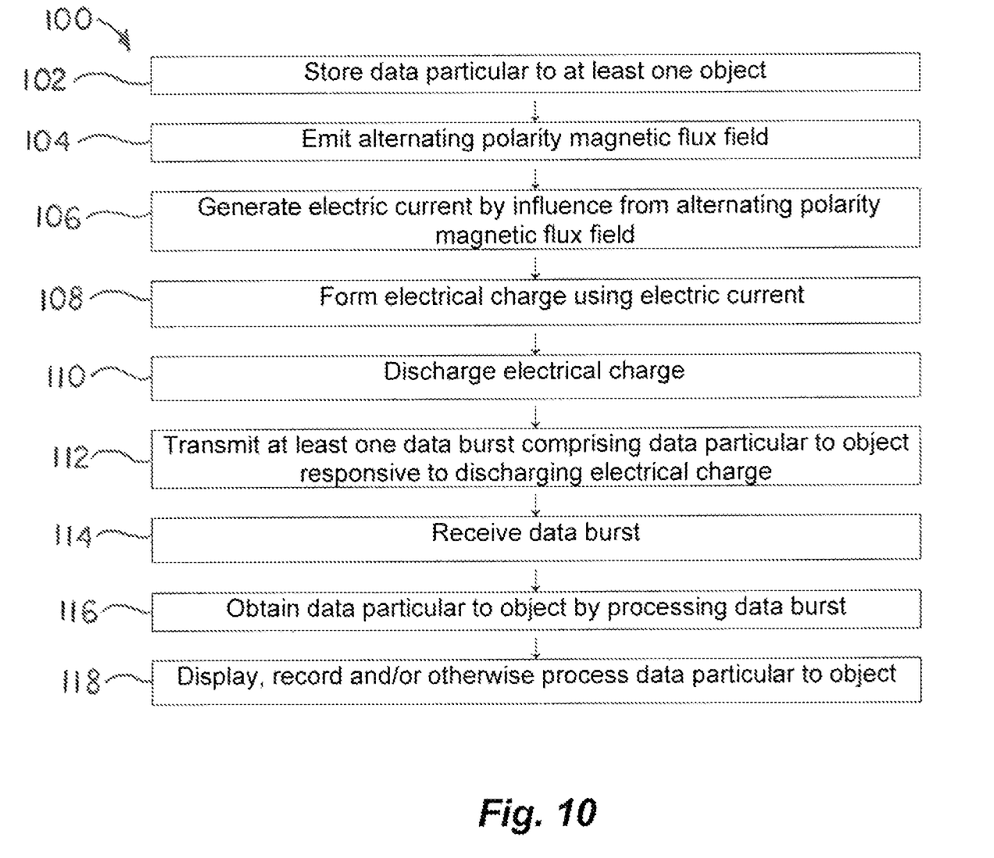
FIG. 10 is a flow diagram of an illustrative embodiment of the methods of the disclosure.

Referring next to FIG. 10 of the drawings, a flow diagram of an illustrative embodiment of the methods of the disclosure is generally indicated by reference numeral 100. At Step 102, data particular to at least one object may be stored.

At Step 104, an alternating polarity magnetic flux field may be emitted.

At Step 106, an electric current may be generated by influence from the alternating polarity magnetic flux field.

At Step 108, an electrical charge may be formed using the electric current.

At Step 110, the electrical charge formed at Step 108 may be discharged.

At Step 112, at least one data burst including the data particular to the object may be transmitted responsive to discharging of the electrical charge at Step 110.

At Step 114, the data burst transmitted at Step 112 may be received.

At Step 116, the data particular to the object may be obtained from the data burst by processing the data burst.

At Step 118, the data particular to the object obtained at Step 116 may be displayed, recorded, and/or otherwise processed.

While certain illustrative embodiments of the disclosure have been described above, it will be recognized and understood that various modifications can be made to the embodiments and the appended claims are intended to cover all such modifications which may fall within the spirit and scope of the disclosure.

I claim:

1. A system suitable for identifying at least one object among a plurality of objects, the system comprising:
    an object excitation circuit configured to emit an alternating polarity magnetic flux field;
    an object circuit configured to be carried by the at least one object, the object circuit configured to:
        store object identifying data particular to the at least one object;
        generate an electric current responsive to influence from the alternating polarity magnetic flux field;
        generate an electrical charge from the electric current;
        discharge the electrical charge; and
        transmit at least one data burst carrying the object identifying data responsive to the discharge of the electrical charge; and
    an object data processing and display system configured to receive the at least one data burst, process the at least one data burst to obtain the object identifying data and process the object identifying data.

2. The system of claim 1 wherein the object circuit configured to be carried by the at least one object comprises the object circuit configured to be carried by at least one gaming token.

3. The system of claim 1 wherein the object excitation circuit comprises an oscillator, a coil driving amplifier interfacing with the oscillator and at least one driving coil interfacing with the coil driving amplifier.

4. The system of claim 1 wherein the object circuit comprises at least one induction coil configured to generate the electric current responsive to the influence from the alternating polarity magnetic flux field, a capacitor interfacing with the at least one induction coil and configured to discharge the electrical charge, and a burst transmitter interfacing with the capacitor, the burst transmitter configured to transmit the at least one data burst.

5. The system of claim 4 further comprising a voltage multiplier interfacing with the capacitor and the burst transmitter.

6. The system of claim 5 further comprising a control logic interfacing with the voltage multiplier, the burst transmitter and the memory with dedicated storage, the control logic configured to initiate transmission of the at least one data burst identifying the object by imbedding the object identifying data stored in the memory with dedicated storage.

7. The system of claim 6 further comprising a voltage threshold trigger interfacing with the voltage multiplier and the control logic.

8. The system of claim 1 wherein the object data processing and display system comprises a burst receiver configured to receive the at least one data burst from the object circuit and at least one computer interfacing with the burst receiver, the at least one computer configured to process the at least one data burst to obtain the object identifying data and display the object identifying data.

9. A system suitable for identifying at least one object among a plurality of objects, the system comprising:
an object excitation circuit comprising:
an oscillator;
a coil driving amplifier interfacing with the oscillator; and
at least one driving coil interfacing with the coil driving amplifier, the at least one driving coil configured to emit an alternating polarity magnetic flux field;
an object circuit configured to be carried by the at least one object, the object circuit comprising:
at least one induction coil configured to generate electric current responsive to the influence from the alternating polarity magnetic flux field;
a voltage multiplier having a capacitor interfacing with the at least one induction coil, the capacitor configured to accumulate an electrical charge from the electric current and discharge the electrical charge;
a memory with dedicated storage configured to store object identifying data particular to the at least one object; and
a burst transmitter interfacing with the capacitor of the voltage multiplier and the memory with dedicated storage, the burst transmitter configured to transmit a plurality of data bursts each carrying the object identifying data responsive to the discharge of the electrical charge; and
an object data processing and display system configured to receive the plurality of data bursts, process the plurality of data bursts to obtain the object identifying data and process the object identifying data.

10. The system of claim 9 wherein the object circuit configured to be carried by the at least one object comprises the object circuit configured to be carried by at least one gaming token.

11. A method suitable for identifying at least one object among a plurality of objects, the method comprising:
storing data particular to the at least one object;
emitting an alternating polarity magnetic flux field;
generating an electric current by influence from the alternating polarity magnetic flux field;
forming an electrical charge using the electric current;
transmitting at least one data burst comprising the data particular to the at least one object responsive to discharging the electrical charge;
receiving the at least one data burst;
obtaining the data particular to the at least one object by processing the at least one data burst; and
processing the data particular to the at least one object.

12. The method of claim 11 further comprising maintaining a unique serial number for the at least one object that can be read and referenced to a database for tracking all information pertaining to the at least one object.

13. The method of claim 11 wherein the at least one object comprises a plurality of casino tokens and comprising energizing and detecting a number of the plurality of casino tokens in a select group of the plurality of casino tokens at a select location on a gaming table supporting the plurality of tokens and comparing the number to a known number of the plurality of tokens being interrogated.

14. The method of claim 11 comprising energizing select areas on a gaming table for selective inventorying of object information in the areas.

15. The method of claim 11 wherein the at least one object comprises a plurality of casino tokens in a tray of tokens and comprising determining a number of each denomination and a total monetary value of the plurality of tokens.

16. The method of claim 11 wherein the at least one object comprises a plurality of casino tokens on a casino table and comprising determining token information regarding each player position of a plurality of player positions on the casino table by energizing only tokens at the each player position.

17. The method of claim 11 wherein the at least one data burst comprises a plurality of data bursts and comprising changing timing of the plurality of data bursts to avoid continuous collisions of data.

18. The method of claim 11 comprising harvesting rates of energy flow to reach a total energy required to transmit meaningful data.

19. The method of claim 11 comprising wherein the at least one object comprises a plurality of casino tokens having a plurality of token serial numbers, respectively, and comprising choosing the token serial numbers to guard against unauthorized duplication of the plurality of tokens.

20. The method of claim 18 comprising detecting duplicate ones of the plurality of token serial numbers at a plurality of locations in a casino to identify fraudulent duplication of the plurality of tokens.

* * * * *